United States Patent [19]

Punj

[11] Patent Number: 5,519,700
[45] Date of Patent: May 21, 1996

[54] TELECOMMUNICATION SYSTEM WITH SYNCHRONOUS-ASYNCHRONOUS INTERFACE

[75] Inventor: Vikram Punj, Naperville, Ill.

[73] Assignee: AT&T Corp., Murray Hill, N.J.

[21] Appl. No.: 350,925

[22] Filed: Dec. 7, 1994

[51] Int. Cl.⁶ ............................. H04L 12/56; H04Q 11/04
[52] U.S. Cl. ..................... 370/60.1; 370/85.13; 370/94.2
[58] Field of Search ................................ 370/58.1, 58.2, 370/58.3, 60, 60.1, 61, 63, 79, 85.2, 85.3, 94.1, 94.2, 85.13, 94.3

[56] References Cited

U.S. PATENT DOCUMENTS

| | | | |
|---|---|---|---|
| 5,130,975 | 7/1992 | Akata | 370/60 |
| 5,168,492 | 12/1992 | Beshai et al. | 370/60.1 |
| 5,359,600 | 10/1994 | Ueda et al. | 370/60.1 |
| 5,361,255 | 11/1994 | Diaz et al. | 370/60 |
| 5,365,521 | 11/1994 | Ohnishi et al. | 370/60.1 |

*Primary Examiner*—Alpus H. Hsu
*Attorney, Agent, or Firm*—Charles L. Warren

[57] ABSTRACT

Line cards provide an input/output interface between synchronous communication channels and an asynchronous network. An input line card generates a plurality of packets where each packet contains information carried by a group of synchronous communication channels; each synchronous communication channel of the group having a destination of the same output line card. A mechanism is provided for selecting a sequence for the sequential transmission of packets from the input line cards to the asynchronous network. The selecting mechanism minimizes the probability that a plurality of the input line cards will concurrently transmit a packet to the same output line card thereby creating a collision of packets requiring that all but one of the colliding packets be stored in a queue. Thus, minimizing collisions also minimizes queuing delays.

12 Claims, 5 Drawing Sheets

TELECOMMUNICATION SYSTEM WITH SYNCHRONOUS-ASYNCHRONOUS INTERFACE

BACKGROUND OF THE INVENTION

This invention is directed to a telecommunication system in which a plurality of synchronous channels are utilized to support corresponding telephone calls and where the synchronous transmission channels are coupled to an asynchronous communication module. More specifically, this invention addresses minimizing the queuing or delay problems associated with providing a synchronous-to-asynchronous interface.

A conventional telecommunication system may utilize a switch such as an AT&T 5ESS® switch consisting of an administrative module, a communications module, and switching modules which support a plurality of telephone subscribers. The switch modules and the communications module each provide synchronous communication channels in which an originating and a terminating subscriber are assigned respective channels (time slots) by which information, such as voice, facsimile, data encoded at 64 Kbps, is transmitted between the subscribers. Since the communications module and the switch modules all use synchronous communication channels, delays associated with storing information in queue are not encountered; each communication path has a pre-assigned time slot in both the communications module and the associated switch modules.

Asynchronous data communication systems such as those using asynchronous packets to carry information provide an alternative to the synchronous communication systems typically utilized for voice communications. Asynchronous communication systems do not have an assigned time slot; instead, asynchronous packets carry the subscriber's conversation. It is possible that a plurality of packets destined for the same node in the asynchronous system may result in the need to buffer or store a predetermined number of packets for delivery to the node. This situation exists where two or more packets concurrently arrive at node. The depth or number of packets which are stored leads to an increased delay for packets traversing such a system. Such timing delays may be significant in certain applications such as when voice or other time critical communications are carried. For example, other equipment associated with the system such as synchronous equipment may have time requirements which limit the maximum allowable delay which can be tolerated to achieve acceptable performance. Thus, there exists a need where synchronous and asynchronous systems are both utilized to carry a telephone call to minimize queuing delays associated with the asynchronous system.

SUMMARY OF THE INVENTION

It is an object of the present invention to provide a method and a corresponding apparatus which controls and minimizes queuing delays associated with an asynchronous system in order to provide acceptable performance in a telecommunication system.

In accordance with an embodiment of the present invention, a telecommunication system utilizes input and output line cards to provide an interface between synchronous communication channels that are interconnected by an asynchronous network. The input line cards translate information received from the synchronous communication channels into composite packets, e.g. several communication channels are carried by each composite packet, for transmission to the asynchronous network. Each input line card transmits packets in synchronization with the other input line cards to the asynchronous network, i.e. all the input line cards will concurrently transmit a packet to the asynchronous network.

An input line card utilized in such a system includes a mechanism for generating a plurality of packets where each packet contains information carried by a group of synchronous communication channels; each synchronous communication channel of the group having a destination of the same output line card. A mechanism is provided for selecting a sequence for the sequential transmission of packets to the asynchronous network. The selecting mechanism minimizes the probability that a plurality of the input line cards will concurrently transmit a packet having the same output line card destination in order to minimize queuing delays.

DETAILED DESCRIPTION

Figure 1:
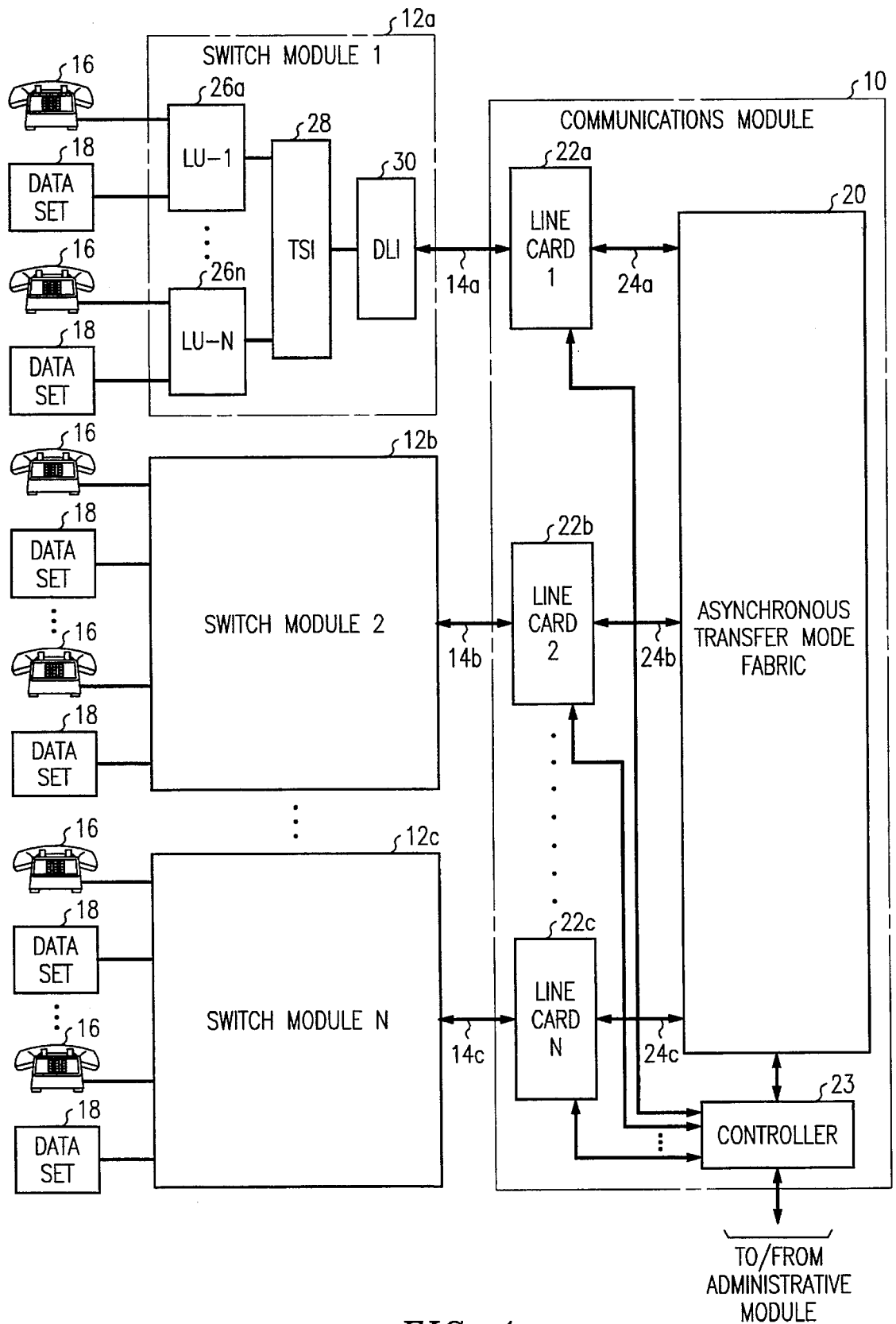
FIG. 1 is a block diagram of a portion of a telecommunication system in accordance with the present invention.

FIG. 1 illustrates a portion of a telecommunication system which incorporates an embodiment of the present invention. A communications module 10 is shown illustrated connected to switch modules 12a, 12b, and 12c by corresponding transmission channels 14a, 14b and 14c. Each of the switch modules may support a plurality of customer premises equipment such as telephone sets 16 and data sets 18. The conventional telephone sets 16 may comprise conventional analog telephones or digital telephones. The data sets 18 represent data communications equipment such as a personal computer which communicates over an analog line utilizing a modem, or a multimedia device which could include digitized video as well as audio or data information.

The communications module 10 includes an asynchronous network 20 which may consist of an asynchronous transfer mode (ATM) fabric. A plurality of line cards 22a, 22b, and 22c are coupled by respective transmission channels 24a, 24b, and 24c to switch 20. The ATM fabric 20 may comprise a known asynchronous ATM system which transports packets of data between ports of the asynchronous system. However, different asynchronous systems could be utilized to transfer packets between the line cards. A controller 23 is coupled to the ATM fabric 20 and each of the line cards 1–N. It controls the routing of calls between the switch module just as controllers used by synchronous communications modules such as used in an AT&T 5ESS switch.

Since the switch modules are substantially identical, only switch module 12a (switch module 1) will be described. A plurality of line units 26a–26N provide an interface to the connected subscriber equipment 16, 18. A time slot interchange (TSI) unit 28 translates digital information from the line units into corresponding time slots which are transmitted to a digital link interface (DLI) unit 30. The unit 30 provides a transmission interface between the TSI unit 28 and a line card in the communications module 10. In accordance with the present invention each DLI unit 30 is supported by a corresponding line card. The switch modules provide the known function of assembling digital information representing a plurality of calls, transmitting it to the communications module 10, and translating the digital information received from the communications module into a format suited for delivery to the customer premises equipment. Switch modules in accordance with the illustrative embodiment are available from AT&T Corp. as part of the 5ESS switch environment.

Figure 2:
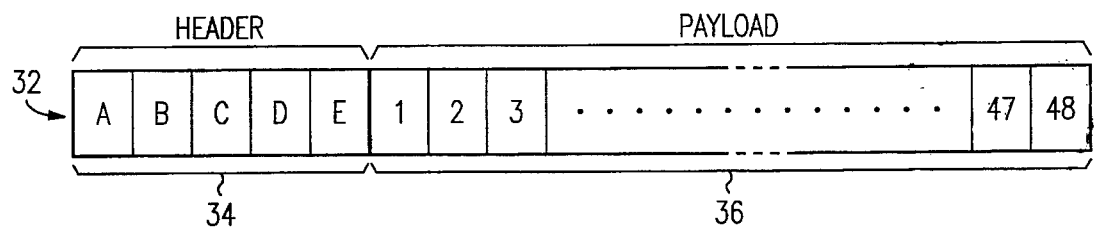
FIG. 2 illustrates an exemplary format of a packet in accordance with the present invention.

FIG. 2 illustrates a format for a packet 32 such as utilized in the ATM network 20 of the embodiment of the present invention. The packet includes a 5-byte header 34 and a payload 36 consisting of 48 bytes of information. Each payload byte carries a time slice of information corresponding to one communication channel. Of course, more than one of the payload bytes can be associated with a single information source to provide a larger effective bandwidth. The packets 32 are carried by the ATM network 20 and are received from and transmitted to the line cards. The header of each packet contains destination information sufficient to permit the ATM fabric 20 to determine which of the line cards 1-N is the destination line card. There is a probability that a plurality of packets destined for the same line card will arrive for delivery at substantially the same time since packets are launched in synchronism from the line cards. Such a condition is referred herein as a collision which means that two or more packets are to be delivered to the same destination at substantially the same time. Minimizing the probability of collisions is explained below in accordance with an embodiment of the present invention. Further, a technique associated with managing collisions is explained below in accordance with another aspect of the present invention.

Figure 3:
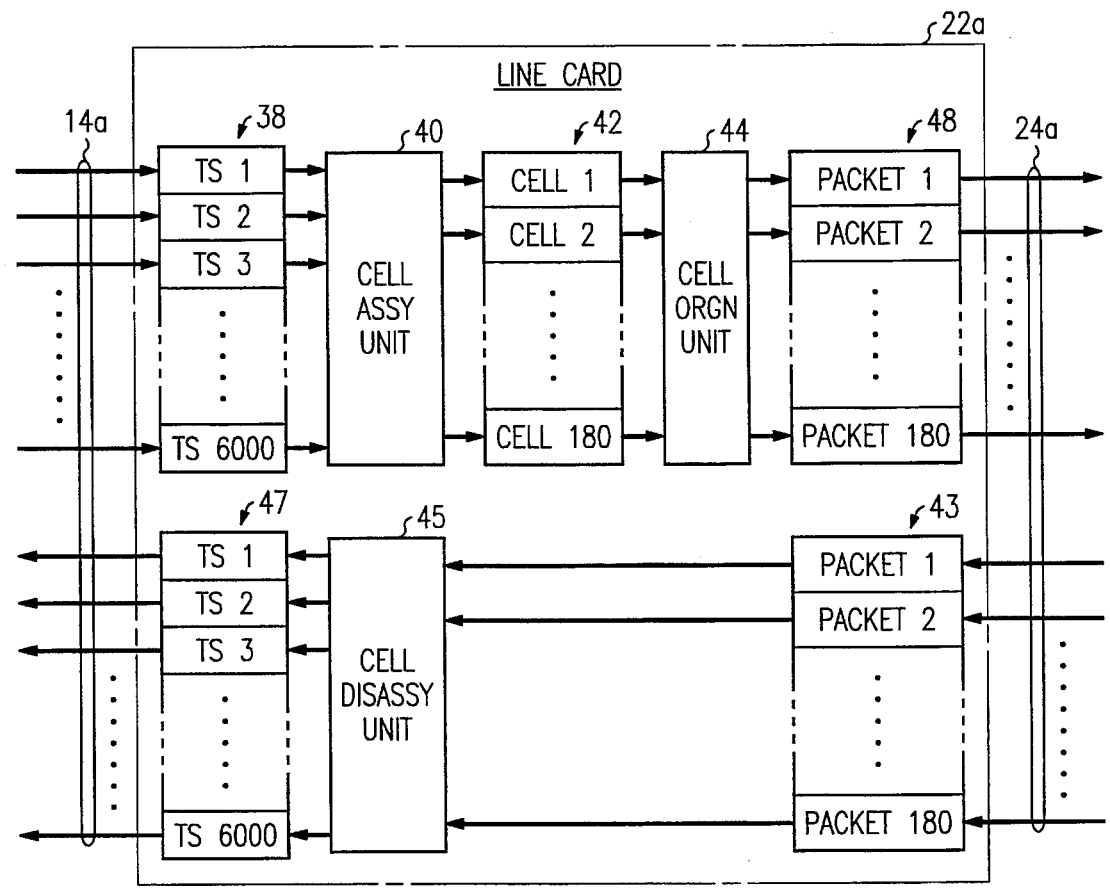
FIG. 3 is a functional block diagram of an exemplary line card in accordance with an embodiment of the present invention.

FIG. 3 is a functional block diagram illustrating an embodiment of line card 22A in accordance with the present invention. Each of the line cards are identical in structure and function. However, it will be appreciated by those skilled in the art that each of the line cards has a separate and unique address enabling it to be individually identified as a destination for packets. Digitized representations of the communication channels generated by a TSI and sent by a DLI of a switch module is received on transmission channel 14A and stored in a shift register 38. In the illustrative embodiment it is assumed that each switch module operates on a synchronous time frame of 125 microseconds and that during each frame, six thousand separate time slots, which could correspond to six thousand different channels (calls), are generated and transmitted to shift register 38. FIG. 3 illustrates the storage of time slots TS1–TS6000 in register 38 representing the time slices received during the frame.

A cell assembly unit 40 assembles the six thousand time slices in the illustrative embodiment into 180 cells which are stored in buffer 42. Each of cells 1–180 as shown in FIG. 3 consists of a packet payload such as shown in FIG. 2. Thus, each cell could carry up to 48 time slices (bytes) resulting in sufficient transmission capability to carry more than the required six thousand time slices in a given 125 microsecond frame. In accordance with the exemplary design, the number of cells to be transmitted during a 125 microsecond frame was selected since the ATM network had a capacity for transferring 180 packets every 125 microseconds for each line card.

A cell organization unit 44 operates on the cells stored in buffer 42 to reorder the sequence in which the cells will be transmitted to the ATM network. The cell organization unit 44 stores the cells in buffer 48 in the order as determined by unit 44 and adds destination information as the packet header to define a corresponding packet. Thus, buffer 48 contains a predetermined sequence of 180 packets to be transmitted sequentially (1, 2, . . . 180) to the ATM network 20 via channel 24a.

An important aspect in accordance with the present invention resides in the recognition of the problem that an excessive number of packet collisions results in queuing delays which can adversely impact the performance of the synchronous portion of the system. In accordance with the present invention the cell organization unit 44 orders the packets for sequential transmission to the asynchronous network to minimize the probability that more than one of the input line cards will concurrently transmit a packet to the same destination output card.

Referring to FIG. 3, the cell assembly unit 40 assembles the time slices contained in register 38 into one of 180 cells contained in buffer 42. Each of the time slices selected by the assembly unit 40 for assembly into a particular given cell will have the same output line card destination since each of the cells in buffer 42 are routed to a single destination output line card. The cell organization unit 44 provides a non-random cell organization technique in which the cells in buffer 42 are ordered by sequence of transmission and placed into buffer 48 for transmission to the ATM network 20. That is, packet 1 is transmitted first, packet 2 second, etc. The line cards are preferably synchronized so that each concurrently transmits a packet to the ATM network. The input line cards sequentially transmit packets 1–180 to the ATM network. The illustrated line card functions both as a packet transmitting and packet receiving mechanism.

Referring to FIG. 1, the line cards 1-N are preferably synchronized in the transmitting of packets to the ATM network so that each concurrently transmits a packet to the ATM network 20. The line cards operate independently in ordering the packets for transmission to the ATM network. The ATM network receives the packets and transfers the packets to the respective output line card destination as deduced from the information contained in the header of the packet. As will be explained in more detail below, a technique is provided in accordance with the present invention which minimizes the probability that two or more input line cards will concurrently transmit a packet having the same output line card destination.

Figure 4:
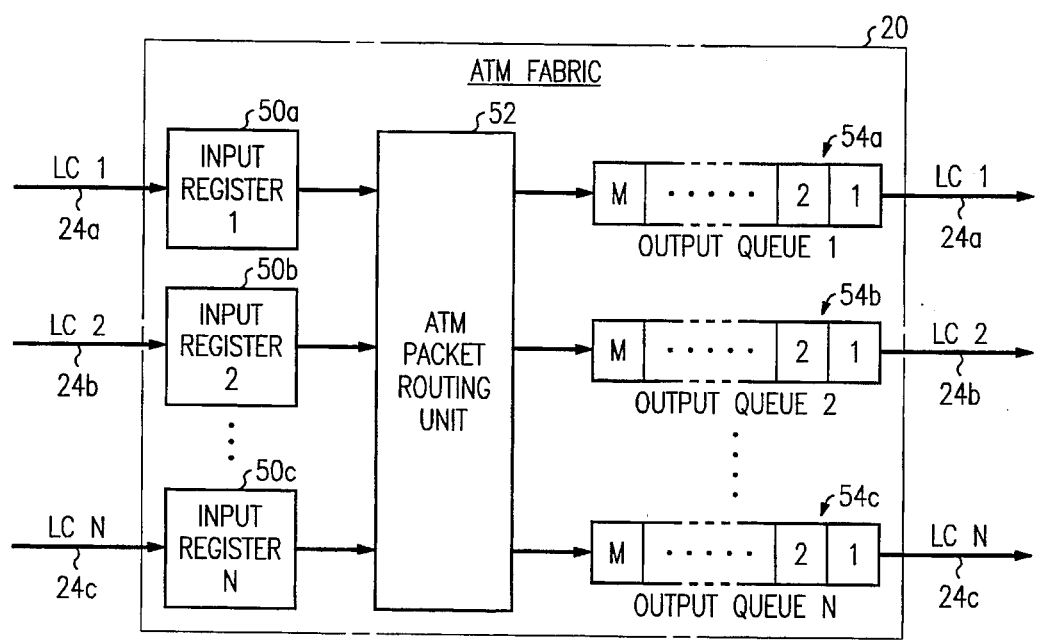
FIG. 4 is a block diagram of an asynchronous transmission fabric or network which may be utilized in accordance with the present invention.

FIG. 4 illustrates a block diagram of an exemplary ATM fabric 20 in accordance with the present invention. The input portion of the bi-directional transmission channels 24A, 24B, and 24C are coupled, respectively, to input registers 50A, 50B, and 50C. Each of these registers stores a packet transmitted by the corresponding line card. Each register transmits the stored packet to the ATM packet routing unit 52 which routes the received packets to the output destination line card. A plurality of output queues 54a, 54b, and 54c receive packets from the packet routing unit 52 and provide a buffer or storage for storing up to M packets waiting to be delivered. It will be apparent to those skilled in the art that it is desirable to minimize the number of packets stored in the output queues in order to control the associated time delays. Further, if the number of packets held in an output queue approaches a predetermined maximum threshold level, the delivery of the packets to the synchronous portion of the communication system may jeopardize the required time synchronization, thereby resulting in the loss of packets or degradation of communication quality to end users.

Figure 5:
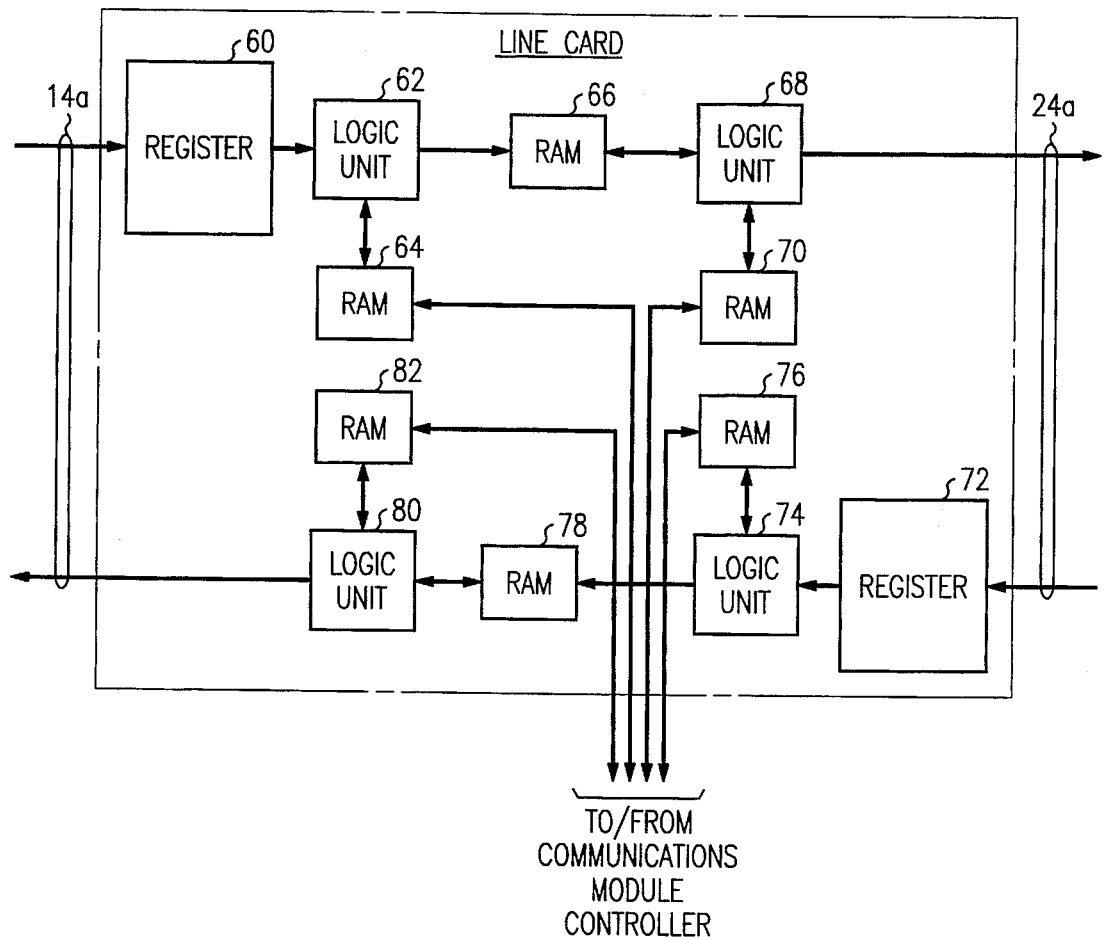
FIG. 5 illustrates a block diagram of an embodiment of an implementation of a line card in accordance with the present invention.

FIG. 5 is a block diagram illustrating an exemplary architecture of a line card in accordance with the present invention. It will be apparent to those skilled in the art that the functional operations illustrated in FIG. 3 may be implemented by the architecture shown in FIG. 5. The time slot data is received on channel 14a by register 60 that stores the data for further processing by logic unit 62 which may comprise a very large scale integrated (VLSI) circuit having predetermined data handling functions including read, write, and index capabilities. The random access memory (RAM) 64 contains a map comprised of addresses that identify locations in RAM 66; the map is written to RAM 64 by the CM controller 23. Logic unit 62 reads the map in RAM 64 and stores each time slice in register 60 at a location in RAM 66 as defined by a corresponding address stored in RAM 64. Predetermined areas in RAM 66 correspond to the cells 1–180 and function as the buffer 42 in FIG. 3. Each of the time slots received by register 60 are written by logic unit 62 to a memory location in RAM 66 corresponding to a cell in accordance with the destination map contained in RAM 64.

Logic unit 68 which may also comprise a VLSI circuit reads sequence map stored in RAM 70 which defines the transmission sequence of each of the cells stored in RAM 66. CM controller 23 writes the map to RAM 70 to control the transmission order of the packets. Logic unit 68 sequentially reads each map element which identifies one cell stored in RAM 66 and contains a destination address for each cell. Logic unit 68 reads the identified cell, appends an appropriate packet header based on the destination address, and transmits the packet on channel 24a to the ATM fabric.

Packets on channel 24a from the ATM fabric are received and temporarily stored by register 72 of the line card shown in FIG. 5. Logic unit 74 which may also comprise a VLSI circuit reads each received packet stored in register 72 and, based upon disassembly map stored in RAM 76, writes each time slice (byte) carried by each packet to a location in RAM 76. The CM controller 23 writes a disassembly map to RAM 76 for every 125 microsecond frame in preparation for the disassembly of the packets. After logic unit 74 receives all packets transmitted during a frame and provides the corresponding disassembly, RAM 78 will contain each time slice to be delivered during the frame to the switching module connected to the particular line card.

Following the translation of all received packets into corresponding time slice data stored in RAM 78, logic unit 80 which may comprise a VLSI circuit transmits each of the stored time slice data in RAM 78 to the associated switch module by channel 14a based upon a time slice map stored in RAM 82. This map identifies the location in RAM 78 of the time slot data that corresponds to each of the 1–6000 time slots. The time slice organizational map stored in RAM 82 is written by the controller 23 for each frame. Logic unit 80 reads time slice data stored in RAM 78 as defined by the map stored in RAM 82 and transmits it to the associated switch module by channel 14a.

In view of the required transmission speeds, it is preferable that the line cards employ hardware logic circuits which can operate on clock cycles of very short duration in order to provide maximum throughput. It will be apparent to those skilled in the art that the intelligence required to create the maps contained in RAM's 64, 70, 76, and 82 could be generated by a single intelligent node or could be generated by distributed intelligence including intelligence contained upon each line card.

Figure 6:
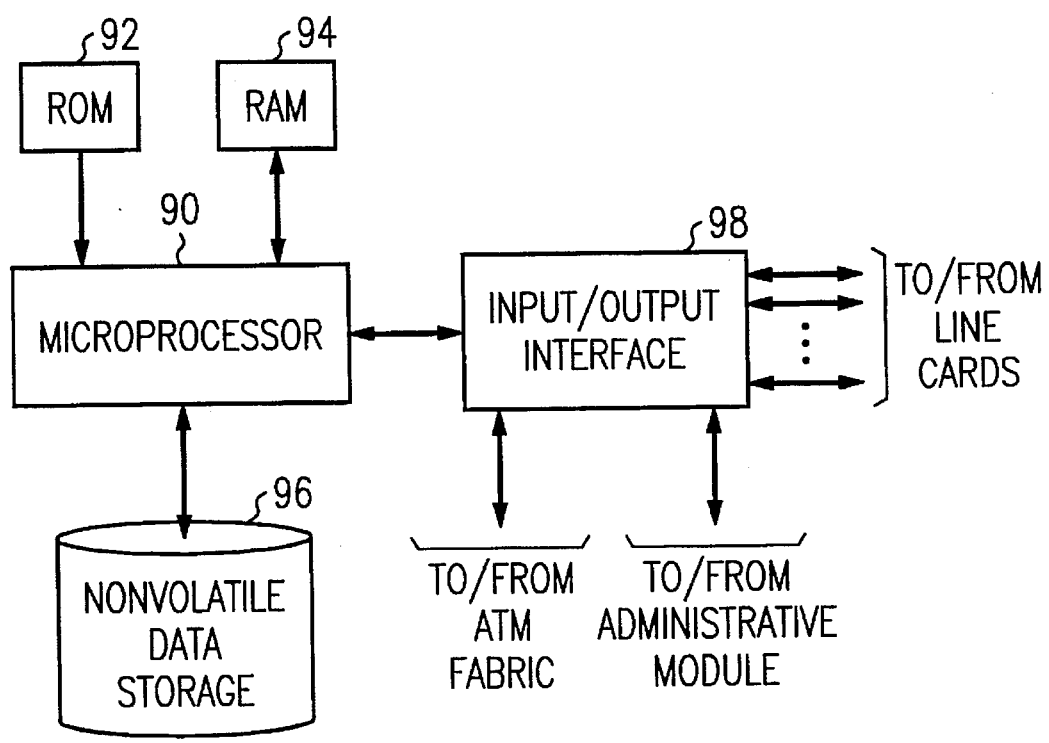
FIG. 6 illustrates a block diagram of an embodiment of a controller as shown in FIG. 1.

FIG. 6 is an illustrative block diagram of an exemplary controller 23 as shown in FIG. 1. A microprocessor 90 operates in cooperation with program instructions and data stored in read-only memory (ROM) 92, random access memory (RAM) 94, and nonvolatile data storage device 96 which may comprise one of various types of nonvolatile data storage including a hard disk drive. An input/output interface circuit 98 is coupled to microprocessor 90 and facilitates the reception and transmission of digital data to the line cards, the ATM fabric, and an administrative module. Digital data written to the Ram's 64, 70, 76, and 82 of each line card control the handling of time slots and packets routed by each line card as described above with regard to FIG. 5. The microprocessor 90 operates under the control of program instructions to accomplish the processing of information required for the general operation of the communications module including information for the operation of each line card. Controllers such as employed by AT&T 5ESS communication modules are known.

In accordance with the present invention, the controller 23 determines the transmission order sequence for the outbound packets by the sequence map stored in RAM 70. This sequence map is based on the following calculation:

$$\text{slot} = (\text{input LC\#} + \text{output LC\#}) \bmod N$$

Where slot is a number upon which the transmission sequence order of a packet is based, the input LC# is the identification number of the input line card, output LC# is the identification number of the output line card, and N is the number of total output line cards. In accordance with an example of an embodiment of the present invention, assume that 16 input and output line cards are utilized with both the input and output line cards numbered 1–16, respectively. Since the above calculation is a function of modulo 16, all combinations of input and output line card numbers will result in the slot being a number between 1 and 16. Each of the cells in RAM 66 (buffer 42) is initially calculated to be one of 16 (1-16) slots. Each cell is then assigned a packet order number in the map of RAM 70 (position in buffer 48) in accordance with the following calculation:

$$\text{packet \#} = \text{slot} + (N*I)$$

where packet # is the packet order number, slot is the number assigned in accordance with the preceding calculation, N is the number of the modulo function of the preceding calculation, and I is a positive integer beginning at zero which represents the previous number of cells which have been assigned the same slot number.

Examples of the ordering of packets to minimize collisions follows in Table 1.

TABLE 1

| input LC # | output LC # | slot | I | packet # |
|---|---|---|---|---|
| 1 | 7 | 8 | 0 | 8 |
| 2 | 7 | 9 | 0 | 9 |
| 2 | 6 | 8 | 1 | 24 (8 + 16) |
| ... | ... | ... | ... | ... |
| 15 | 9 | 8 | 10 | 168 (8 + 160) |
| 16 | 8 | 8 | 11 | >180 (8 + 176 = 184) |

The first two rows in Table 1 illustrate the benefit of the slot calculation by illustrating that the same output line card destination (7) for packets to be transmitted by the first and second line cards are assigned to packets 8 and 9, respectively. Thus, a collision conflict at output line card 7 is avoided. The third row illustrates the assignment of packets where a prior slot has been previously utilized, i.e. I>0. The penultimate row illustrates the assignment of slot 8 where I=10 resulting in a packet assignment of 168. The last row illustrates an example in which the calculation for assigning the packet number would result in the assignment of a number greater than 180. The calculation for assigning packet numbers is followed where the resulting number is less than or equal to 180. Where the packet number calculation results in a number greater than 180, a remaining available packet slot is selected based on the first non-assigned packet slot starting at packet slot 1. Alternatively, any non-assigned packet slot could be randomly selected.

Where the packet number calculation results in a number of 180 or less, such packet transmissions will not collide with other packets. However, when the packet calculation exceeds 180, it will be apparent that it is possible that the selected packet may collide with another packet transmitted from another line card having the same output line card destination. In normal traffic loading, the embodiment in accordance with the present invention will assign a majority of the output packet numbers for each of the line cards in accordance with the calculation. This minimizes the statistical likelihood of collisions as contrasted with a system in which only random selection is utilized.

Another aspect in accordance with an embodiment of the present invention resides in the detection and control of cells which would result in excessive collisions. Table 2 below illustrates the storage of packet assignment information on a per-packet basis.

TABLE 2

| packet # | input LC 1 | input LC 2 | ... | input LC 16 |
|---|---|---|---|---|
| 1 | 7 | | | |
| 2 | | 7 | | |
| 3 | | | | |
| ... | ... | ... | ... | ... |
| 180 | | | | |

The information stored in Table 2 shows, for each packet number and each input line card, the corresponding output destination line card assignment. For example, in packet 1, the input line card 1 has assigned a packet having a destination output line card 7. For packet number 2, for input line card 2, an assignment has also been made to transmit a packet to output line card 7. This table is based upon the assignment of packets as determined in accordance with Table 1 in the above-described calculations.

Table 3 below illustrates for each packet number and for each output destination line card, the number of colliding packets which will be received by the respective output line card after each of the 180 packet transmissions. The information contained in Table 3 can be derived from Table 2 by summing across the rows in Table 2 to determine where there are more than one entry in the row for the same output line card number. For example, if the number 2 occurred twice in packet number 1 in Table 2, this would indicate that at least two input line cards would be concurrently transmitting a packet having a destination of output line card 2. This would correspond to a collision of two packets for delivery during the same transmission time. This result is shown in Table 3 under the output line card 2 by indicating that two collisions will occur during the transmission of the first packet in the sequence.

TABLE 3

| packet # | output LC 1 | output LC 2 | ... | output LC 16 |
|---|---|---|---|---|
| 1 | | 2 | | |
| 2 | 3 | | | |
| 3 | 2 | | | |
| ... | ... | ... | ... | ... |
| 180 | | | | 3 |

Table 4 below represents the cumulative number of packets queued for output to each output line card. The information contained in this table can be derived from Table 3.

TABLE 4

| packet # | output LC 1 | output LC 2 | ... | output LC 16 |
|---|---|---|---|---|
| 1 | | 1 | | |
| 2 | 2 | | | |
| 3 | 3 | | | |
| ... | ... | ... | ... | ... |
| 180 | | | | 2 |
| total | 3 | 1 | | 2 |

For example, consider packet number 1, output line card 2 in Table 4 has an entry of "1" which equals the corresponding matrix position in Table 3 minus one. One is subtracted on each occurrence of the total number of colliding cells since one of the colliding cells will be delivered during each of the packet number slots. In Table 4, packet number 3, output line card 1 contains a value of 3 which is calculated from Table 3. For packet number 2, output line card 1 in Table 3 has three collisions and for packet number 3, has two collisions. In Table 4, for output line card 1, packet number 2 shows a value of 2 (3 minus 1) and in packet number 3, shows a value of 3 (2 plus (2 minus 1)). For each of the respective output line cards and for each packet number, a cumulative value is calculated representing the number of packets to be held in storage or queued awaiting delivery to the corresponding output line card based on each packet transmission. The total in Table 4 represents the final number of remaining packets, if any, which would be held in a queue still to be delivered to the corresponding output line card after all 180 packets in a frame had been sent to the ATM network. This number can be visualized by referring to FIG. 4. Each of the output queues in would contain the number indicated in the last row of FIG. 4 for each corresponding line card.

The largest number of cells contained in any one of the output queues following the transmission of 180 packets represents the maximum time delay or skew which would be required in order to complete the transmission of all packets. A finite time can be associated with each packet stored in an output queue and hence, depending upon the time constraints of the synchronous portion of the system, a predetermined threshold can be calculated of the maximum number of packets which can be held in an output queue in order to still satisfy the timing requirements as constrained by the synchronous network. Thus, a number greater than the maximum number of permitted cells to be held in the output queue would represent a time delay not permitted in order to maintain proper operation of the synchronous network.

Not all of the time slices associated with a given packet may be occupied, i.e. less than 48 telephone calls may be carried by a packet so that some of the 48 bytes of the packet are not used. Additional telephone calls are preferably handled without creating a new packet (cell) by using unallocated bytes in an existing cell having the same destination as needed for the new call, thereby only increasing its payload to carry the additional traffic. This assignment technique can be implemented by maintaining a table where each existing packet's destination and bytes used are stored. Such a table is consulted when new calls are requested to determine if an existing packet is available to handle a new call. A calculation is made in accordance with the exemplary embodiment of the present invention to generate a new packet (a packet number assignment is tentatively made for the new packet) only if an additional byte in an existing cell with the proper destination is unavailable to accommodate the new call.

A maximum payload of time slices is carried by 180 packets, however, a fewer number of required time slices may result in the transmission of a fewer number of packets. Where a new packet is required to be originated to handle a new call request, and where the tentative packet number assignment results in a collision that increases the number of packets which will be held in an output queue, the request to establish the new call can be denied in accordance with a preferred embodiment of the present invention to prevent an excessive timing skew or degradation of performance. Thus, call requests which would result in the generation of an additional packet that would in turn lead to an excessive number of packets held in an output queue, will be denied. The denial of this request is communicated by the controller 23 back to the originating central office which in turn provides the requesting subscriber with an indication such as an "all trunks busy" audible signal.

Various modifications and alternative embodiments can be utilized within the scope of the present invention. For example, the functions of the line cards of the illustrative embodiment could be incorporated in other apparatus, e.g. either the switch modules or the ATM fabric could include such functions. Alternative packet formats may contain a varying number of payloads corresponding to one or a plurality of calls.

Although an embodiment of the present invention has been described above and shown in the drawings, the scope of the invention is defined by the claims which follow.

I claim:

1. In a telecommunication system in which input and output line cards provide an interface between corresponding input and output synchronous communication channels that are interconnected by an asynchronous network, the input and output line cards transmitting packets to and receiving packets from the asynchronous network, the input line cards translate information received from the synchronous communication channels into packets for transmission to the asynchronous network, the telecommunication system comprising:

means for generating a plurality of packets where each packet contains information carried by a group of the synchronous communication channels, each synchronous communication channel of the group having a destination of the same output line card;

means coupled to the generating means for selecting a sequence for the sequential transmission of the packets to the asynchronous network, the selecting means minimizing the probability that a plurality of input line cards will concurrently transmit a packet having the same output line card destination in order to minimize queuing delays;

means coupled to and responsive to the selecting means for transmitting the packets to the asynchronous network in accordance with the sequence;

the input and output line cards are each assigned an identification number, the selecting means minimizing the probability by assigning each packet a non-random transmission sequence order based on a calculation which is a function of both the input line card identification number and the destination output line card identification number.

2. The telecommunication system according to claim 1 wherein the calculation is also a function of the quantity of output line cards.

3. The telecommunication system according to claim 2 wherein the calculation includes the following:

$$\text{slot} = (\text{input LC \#} + \text{output LC \#}) \text{ modulo } N,$$

where slot is a number upon which the transmission sequence order of a packet is based, input LC # is the identification number of the input line card, output LC # is the identification number of the output line card, and N is the quantity of output line cards.

4. The telecommunication system according to claim 3 wherein the calculation includes the following:

$$TS = \text{slot} \pm N*I$$

where TS is a packet sequence order assignment provided TS does not exceed the total number of packets to be transmitted during a frame, I is a number representing the prior number of times a packet has been assigned to the same output line card during the frame.

5. A communication module in a telecommunication system comprises:

an asynchronous network which transfers packets asynchronously;

input and output line cards which provide an interface between the asynchronous network and communication channels that carry subscriber information, the input line cards translate information received from the communication channels into packets for transmission over the network, the input line cards transmit packets to the asynchronous network;

means for selecting a non-random sequence for the sequential transmission of the packets to the asynchronous network, the selecting means minimizing the probability that a plurality of input line cards will concurrently transmit a packet having the same output line card destination in order to minimize queuing delays;

means coupled to and responsive to the selecting means for transmitting the packets to the asynchronous network in accordance with the sequence;

the input and output line cards are each assigned an identification number, the selecting means minimizing the probability by assigning each packet a transmission sequence order based on a calculation which is a non-random function of both the input line card identification number and the output line card identification number.

6. The communication module according to claim 5 wherein the calculation is also a function of the quantity of output line cards.

7. The communication module according to claim 6 wherein the calculation includes the following:

$$\text{slot} = (\text{input LC \#} + \text{output LC \#}) \text{ modulo } N,$$

where slot is a number upon which the transmission sequence order of a packet is based, input LC # is the identification number of the input line card, output LC # is the identification number of the output line card, and N is the quantity of output line cards.

8. The communication module according to claim 7 wherein the calculation includes the following:

$$TS = \text{slot} \pm N*I$$

where TS is a packet sequence order assignment provided TS does not exceed the total number of packets to be transmitted during a frame, I is a number representing the prior number of times a packet has been assigned to the same output line card during the frame.

9. In a telecommunication system in which input and output line cards provide an interface between communication channels that are interconnected by an asynchronous network, the input line cards transmitting packets to the asynchronous network, the input line cards translate information received from a plurality of the communication channels into packets for transmission to the asynchronous network, a method comprising the steps of:

selecting a non-random sequence for the sequential transmission of the packets to the asynchronous network, the selecting step minimizing the probability that a plurality of input line cards will concurrently transmit a packet having the same output line card destination in order to minimize queuing delays;

assigning each of the input and output line cards an identification number, the selecting step minimizing the probability by assigning each packet a transmission sequence order based on a calculation which is a function of both the input line card identification number and the output line card identification number;

transmitting the packets to the asynchronous network in accordance with the sequence.

10. The method according to claim 9 wherein the calculation is also a function of the quantity of output line cards.

11. The method according to claim 10 wherein the calculation includes the following:

$$\text{slot} = (\text{input LC \#} + \text{output LC \#}) \bmod N,$$

where slot is a number upon which the transmission sequence order of a packet is based, input LC # is the identification number of the input line card, output LC # is the identification number of the output line card, and N is the quantity of output line cards.

12. The method according to claim 11 wherein the calculation includes the following:

$$TS = \text{slot} \pm N*I$$

where TS is a packet sequence order assignment provided TS does not exceed the total number of packets to be transmitted during a frame, I is a number representing the prior number of times a packet has been assigned to the same output line card during the frame.

* * * * *